March 21, 1950     L. S. WILLIAMS     2,501,247
WEIGHING SCALE
Filed Oct. 31, 1944     4 Sheets-Sheet 1
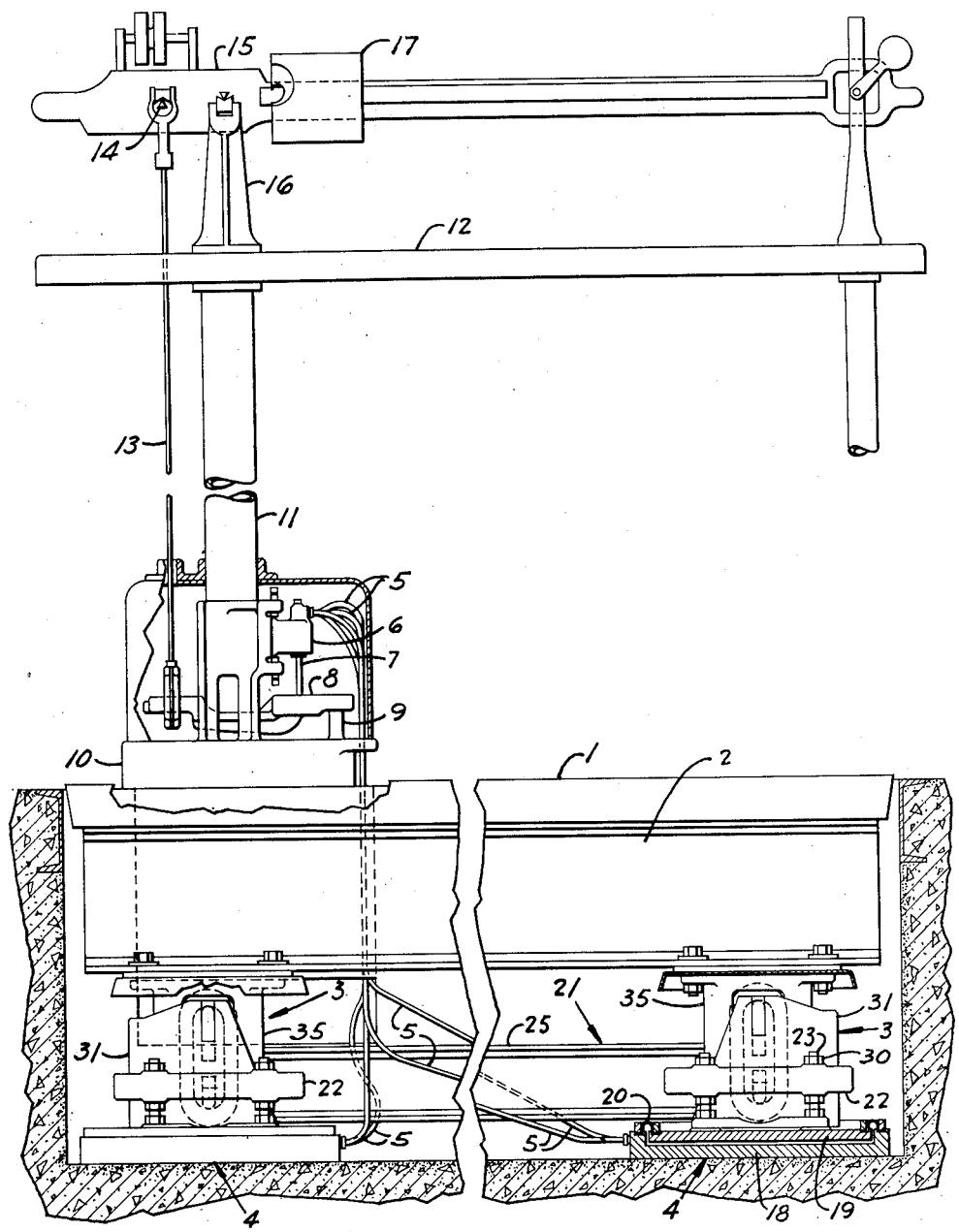
Fig. I
INVENTOR.
Lawrence S. Williams
BY
Marshall & Marshall
ATTORNEYS

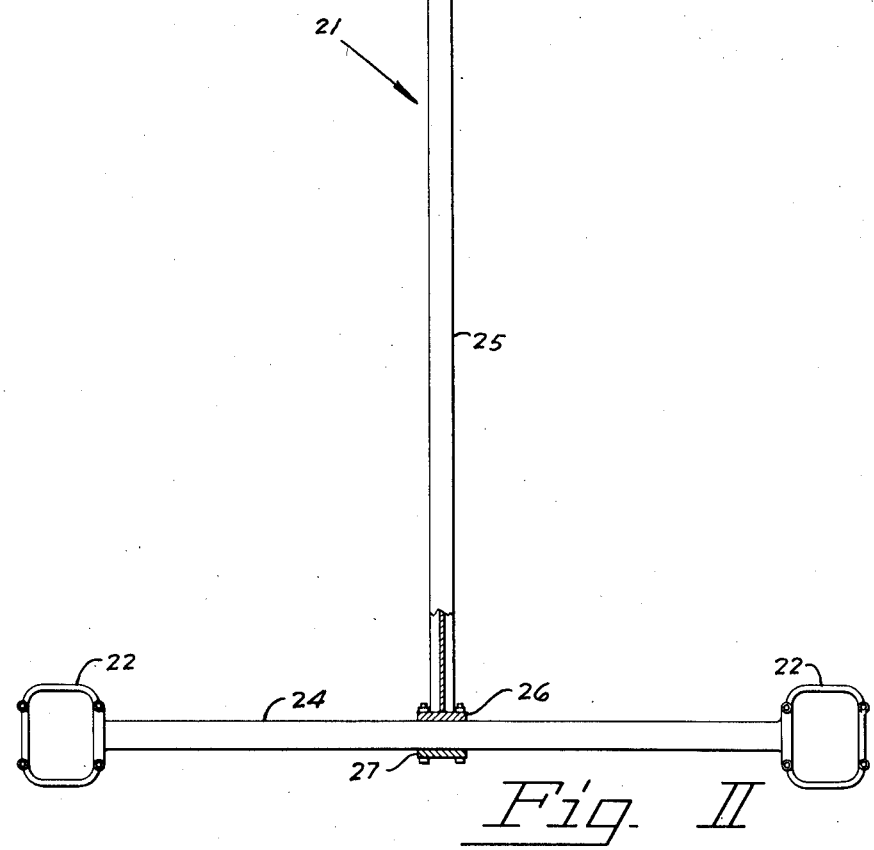
Fig. II
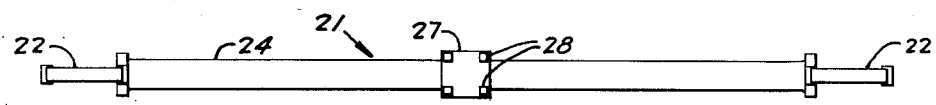
Fig. III
INVENTOR.
Lawrence S. Williams
BY
Marshall and Marshall
ATTORNEYS March 21, 1950 — L. S. WILLIAMS — 2,501,247
WEIGHING SCALE
Filed Oct. 31, 1944 — 4 Sheets-Sheet 3
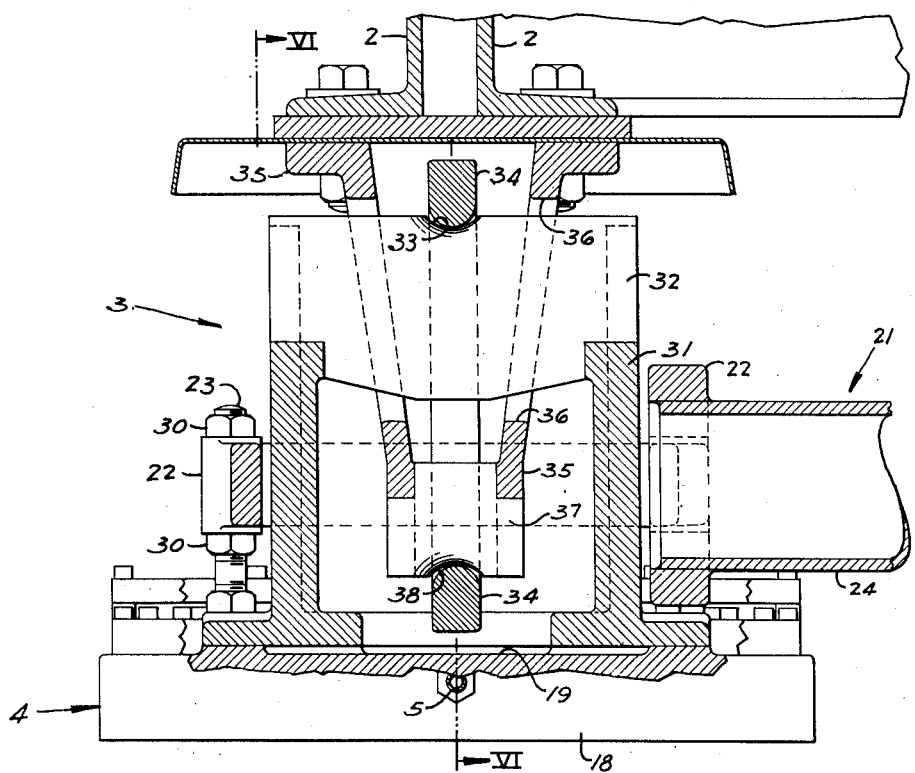
Fig. V
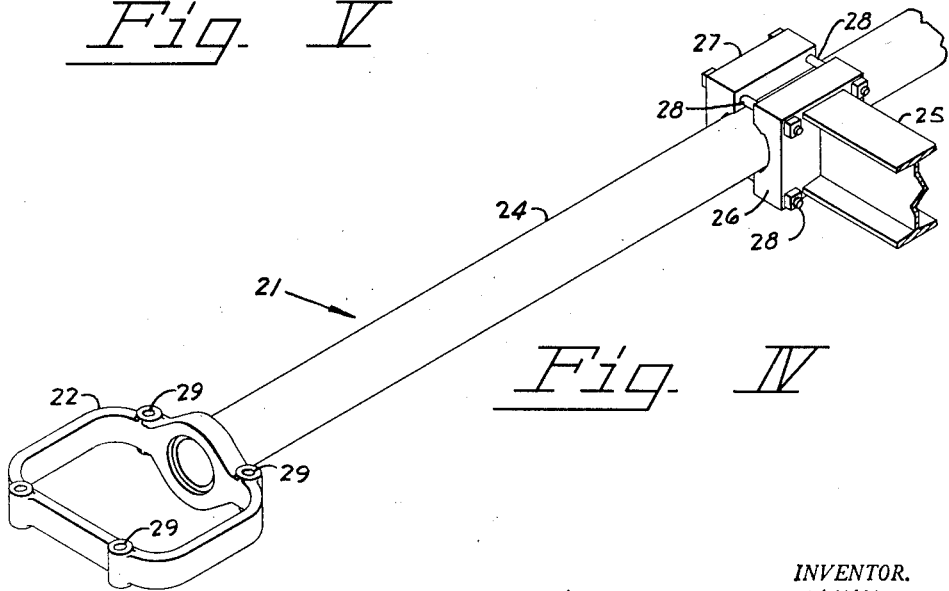
Fig. IV
INVENTOR.
Lawrence S. Williams
BY
Marshall & Marshall
ATTORNEYS March 21, 1950   L. S. WILLIAMS   2,501,247
WEIGHING SCALE
Filed Oct. 31, 1944   4 Sheets-Sheet 4
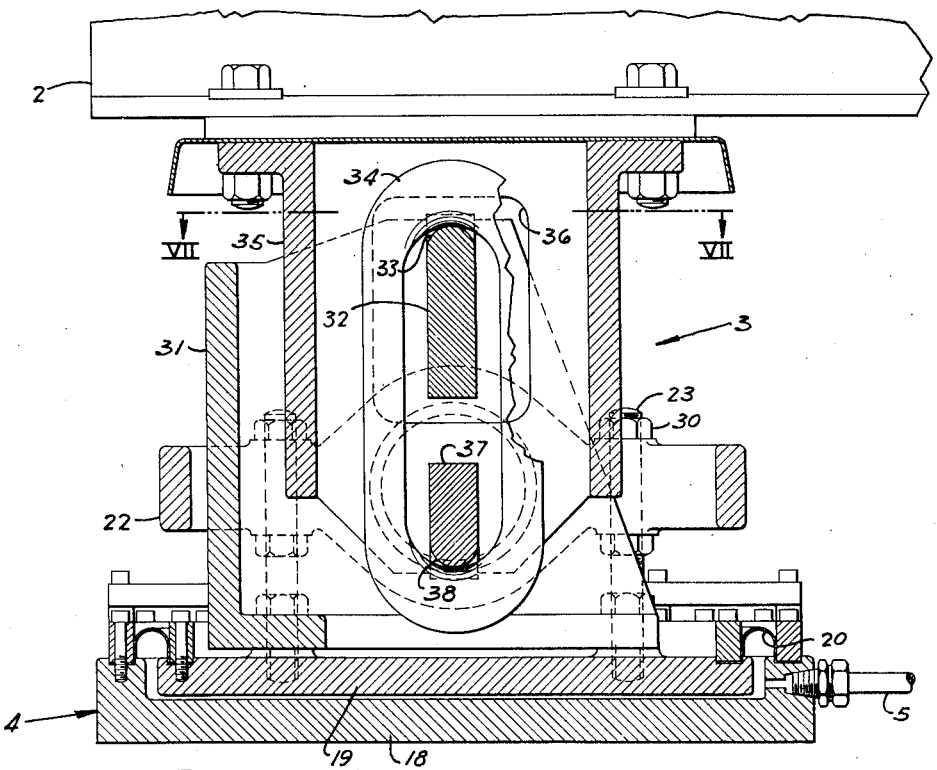
Fig. VI
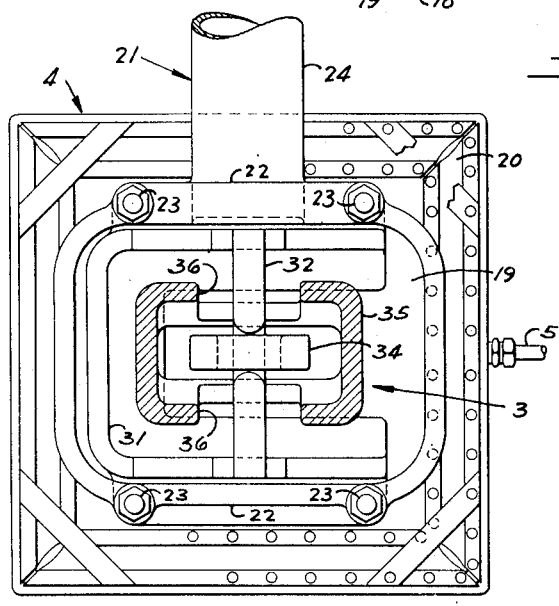
Fig. VII
INVENTOR.
Lawrence S. Williams
BY
Marshall & Marshall
ATTORNEYS Patented Mar. 21, 1950

2,501,247

UNITED STATES PATENT OFFICE 2,501,247

WEIGHING SCALE

Lawrence S. Williams, Toledo, Ohio, assignor to Toledo Scale Company, Toledo, Ohio, a corporation of New Jersey Application October 31, 1944, Serial No. 561,194

7 Claims. (Cl. 265—47)

This invention relates to weighing scales and in particular to a suspension system interposed between the load receiver of a weighing scale and the supporting load sensitive mechanism. While the invention is of peculiar advantage in hydraulic scales it may also be used in conventional lever scales.

When a hydraulic force transmitter, i. e. a combination of a capsule at the load receiver and a bellows in the counter-balancing and indicating mechanism, is used in a weighing scale it is necessary that the effective area of the capsule remain precisely constant regardless of the distribution of the load on the load receiver. It has been common practice in hydraulic scales to support the load receiver directly from the capsules. Scales constructed in this manner are subject to errors in indication depending upon the location and distribution of the load on the load receiver. These errors are the result of tipping of the diaphragms of the hydraulic capsules in response to the bending of the load receiver or platform under load. The longitudinal members of the platform act as simple beams supported at their ends. Therefore, when a load is applied intermediate their ends they deflect under the load and their ends assume a definite slope depending upon the amount and distribution of the load. The tipping of the capsule diaphragms causes them to present a smaller horizontal effective area to the hydraulic fluid and they therefore create a greater hydraulic pressure than they would have produced had they remained in a level condition. Thus, for example, if the load on the scale were a truck with a wheel located over each capsule there would be no bending forces generated in the load receiver, no tendency to tip the capsule diaphragms and, therefore, no error from this source. However, if the same load were concentrated in the center of the platform, bending of the platform would occur and the indication of weight would be somewhat greater.

The principal object of this invention is to provide a light-weight economical structure which, when interposed between a load receiver and a set of hydraulic capsules, will prevent the capsule diaphragms from tipping in response to bending of the platform under load.

Another object of the invention is to provide a suspension system for the load receiver of a hydraulic scale which will allow a substantial horizontal motion of the load receiver without transmitting appreciable lateral force to the capsules.

Another object of the invention is to provide a light-weight rigid frame for holding the diaphragms of a set of hydraulic capsules in a level condition.

An ancillary object is to provide a suspension system which may be used in a lever system of a scale to eliminate horizontal thrusts on the pivots because of platform deflection.

These and other objects and advantages are attained in the structure shown in the drawings which illustrates a preferred embodiment of the invention.

In the drawings:

Figure I is a front elevation, partly in section, of a hydraulic weighing scale embodying the invention.

Figure II is a plan, partly in section, of the framework employed to stabilize the diphragms of the hydraulic capsules.

Figure III is a front elevation of the stabilizing framework.

Figure IV is a perspective view showing a fragment of the stabilizing framework.

Figure V is a front elevation, partly in section, of one of the suspensions employed between a load receiver and one of the capsules.

Figure VI is a vertical section taken substantially along the line VI—VI of Figure V.

Figure VII is a plan view of the suspension, partly in section, as seen from the line VII—VII of Figure VI.

These specific drawings and the accompanying description merely illustrate a preferred form of the invention and are not intended to impose limitations upon the claims.

The invention lies in supporting each corner of a load receiver on a single tension member which is incapable of transmitting a force perpendicular to its length and in joining the several diaphragms of the hydraulic capsules supporting the load receiver with a light-weight rigid framework. Inasmuch as the framework carries none of the load it need supply only the force required to resist tipping forces produced by lack of plumbness of the tension members of the suspensions. These tipping forces are relatively small in comparison with the force which would be required to maintain the ends of the platform beams level during the application of a load at the center of the platform. Thus this structure permits the attainment, with a relatively light-weight platform, of an accuracy ordinarily associated only with a heavy rigid platform. It thus affords higher accuracy with less weight of material and a much smaller dead load on the weighing mechanism.

A hydraulic weighing scale incorporating a preferred embodiment of the invention is shown in the drawings. This scale comprises a load receiving platform 1 supported on longitudinal girders or beams 2. Each end of each girder 2 is supported on a suspension 3 resting on a hydraulic capsule 4. The capsules translate the downward force of a load on the platform 1 into an equivalent hydraulic pressure which is transmitted through pipes 5 to receiving bellows mounted in a bellows housing 6. The bellows translate the hydraulic pressure back into mechanical force which is transmitted from the bellows through a series of pivotally mounted struts 7 to a lever 8. The lever 8 is fulcrumed on a pedestal 9 erected from a base 10 which base also supports a column 11. A weigh beam shelf 12 is carried on the upper end of the column 11. The lever 8 is pivotally connected through a steelyard 13 to a load pivot 14 of a weigh beam 15. The weigh beam 15 is fulcrumed on a fulcrum stand 16 erected on the weigh beam shelf 12. Force from the bellows, transmitted through the steelyard 13, is counter-balanced by a poise 17 slidably mounted on the weigh beam 15.

The hydraulic capsules 4 each comprise a rectangular recessed base 18 and a diaphragm 19 loosely fitted within the recess. The space within the recess of the base 18 beneath and around the diaphragm 19 is filled with a hydraulic fluid. Flexible metallic membranes 20 extend along and are connected to each of the sides of the diaphragm 19 and adjacent sides of the base 18. At the corners the membranes 20 are mitered, as seen in Figure VII, and the gaps left between the membranes are sealed with a formed rubber member cemented to the adjacent membranes. This capsule construction is disclosed in detail in a copending application Serial Number 496,114 now Patent No. 2,359,721.

The diaphragms 19 of the hydraulic capsules 4 are maintained in a level, aligned conditioned by an H-shaped stabilizing framework 21 (see Figures II, III, and IV). The capsule engaging portion of this framework comprises rigid metallic loops 22 supported on studs 23 from the diaphragms 19. The loops 22, at each end of the scale, are rigidly connected by pipes 24. The pipes 24 are, in turn, connected by an I-beam 25 forming the crossbar of the H shape. The I-beam 25 is connected to each pipe by means of a clamp having a portion 26 secured, as by welding, to the end of the I-beam and a mating portion 27 cooperating to encircle and grip the pipe. The gripping action is secured by tightening bolts 28 extending through the clamp portions 26 and 27.

When the scale is being installed, the capsules 4 are loosely positioned in their approximate location and the framework 21 is lowered into place. The capsules are then shifted about until the studs 23 fit through holes 29 in the loops 22 without binding or tipping the diaphragms 19. Selective tightening of nuts 30 on the studs 23 allows the diaphragms 19 to be brought to a true level condition.

Inasmuch as the capsules are widely spaced and the framework 21 is rigid torsionally, there is little possibility for the diaphragms 19 to be tilted under the application of loads applied centrally on the diaphragms.

To secure central loading of the diaphragms the platform 1 is supported from the capsules by suspensions each of which includes a tension member. The provision of the tension member prevents the transmission of a bending moment and the consequent tipping of the capsule diaphragm. Each of these suspensions comprises a three-sided box-like frame 31 bolted to the diaphragm 19 of the associated capsule 4. The sides of the box-like frame 31 are slotted part way down from the top to receive the ends of a crossbar 32 spanning the space between the sides. The top edge of the crossbar 32 has a shallow depression 33 which serves to locate the top end of a suspension link 34. A hollow wedge-shaped bracket 35 bolted thick end uppermost to the underside of the girders 2 extends downwardly into the box-like frame 31. Windows 36 cut through the sides of the wedge-like frame 35 accommodate the crossbar 32. The sides of the bracket 35 are slotted upwardly from the bottom to accommodate a second shorter crossbar 37. The lower surface of the crossbar 37 is provided with a shallow groove 38 which rests in the bottom end of the suspension link 34. The shallow grooves 33 and 38 have a larger radius of curvature than that of the contacting portions of the suspension link 34 so that any lateral motion of the platform is accommodated by rolling motion between the link 34 and the crossbars 32 and 37. As far as the transmission of force is concerned, the crossbars 32 and 37 may be considered as adjacent links of a chain, the suspension link 34 being the intermediate link. It is thus readily apparent that the suspension can transmit tension forces through the link 34 but can not transmit any bending force, i. e. any force in a direction perpendicular to the axis of the link.

By interposing these suspensions between the platform and the hydraulic capsules the framework 21 is relieved from resisting any forces tending to tip the capsule diaphragms 19 other than a small relatively insignificant lateral force produced by an out of plumb condition of the suspension links 34.

The tendency for the links 34 to be deflected to an out of plumb condition due to the bending of the platform girders 2 may be kept to a minimum if the vertical height of the bracket 35 is adjusted to the depth of the girders 2. When the girders 2 bend as a result of a load near the center of their span, they tend to shorten the distance between their ends. At the same time they also change the slope at their ends, the ends tending to tilt upwardly. The brackets 35 are attached to the underside of the girders and extend downwardly therefrom. It is thus possible to so proportion the size of the bracket and the girder so that apparent shortening of the girder due to its deflection is compensated by the spreading of the lower ends of the brackets as a result of the change in slope at the ends of the girder. If these effects exactly compensate each other the only result of a bending of the girders will be a slight rocking of the lower crossbar 37 in the lower end of the suspension link 34. Inasmuch as the suspension link 34 is not laterally deflected thereby there can be no lateral force transmitted to the capsule and therefore no error introduced into the weighing mechanism due to the girder deflection.

Having described the invention, I claim:

1. In a device of the class described, in combination, a plurality of hydraulic capsules serving as the sole support for a load receiver for transforming load force into hydraulic pressure, a diaphragm forming part of each capsule, a load receiver, a support erected from each diaphragm, a bracket positioned over each capsule depending from the load receiver, a single link suspended from each of said supports engaging the bracket associated therewith, and means rigidly interconnecting the supports for preventing tipping of the diaphragms in response to loads applied to the supports.

2. A suspension for a load receiver supported on hydraulic capsules comprising a frame erected upon the diaphragm of a capsule, a bracket depending from the load receiver, crossbars on said frame and said bracket, the crossbar of said bracket being positioned below the crossbar of said frame, a single link encircling said crossbars, and means rigidly connecting the diaphragm to the diaphragms of at least two other capsules for guiding the diaphragm against tipping.

3. A suspension system for supporting a load receiver on a set of hydraulic capsules, said suspension system comprising a frame erected upon the diaphragm of each capsule, a bracket depending from the load receiver, crossbars in said frames and in said brackets, the crossbars of said brackets being located below the crossbars of said frames, a single link encircling each set of crossbars thereby supporting said brackets from said frames, a ring surrounding and attached to each of said frames, and a framework connecting said rings.

4. A suspension system for supporting a load receiver on a set of hydraulic capsules, said suspension system comprising a frame erected upon the diaphragm of each capsule, a bracket depending from the load receiver over each capsule, crossbars on said frame and said bracket, the crossbar of said frame being above the crossbar of said bracket, a single link encircling said crossbars, and a framework connecting said frames, said framework comprising an H-shaped structure having one of said frames at each extremity.

5. In a device of the class described, in combination, a load receiver, supporting brackets depending from the load receiver, a plurality of hydraulic capsules serving as weight-responsive supports for the load receiver, each of the capsules having a hydraulically supported diaphragm, a frame erected on each diaphragm, members engaging the frames and the brackets for transmitting force therebetween, there being one such member for each capsule, each member being formed to rockably contact the associated frame and bracket at substantially single points, and a framework connecting each diaphragm to at least two other diaphragms for preventing tipping of the diaphragms.

6. A suspension system for supporting a load receiver on a set of hydraulic capsules, said suspension system comprising a frame erected on the diaphragm of each capsule, a bracket depending from the load receiver over each frame, a force transmitting member that rockably contacts the frame and the bracket at single points only, a framework interconnecting the frames of the set of capsules and means for adjusting the condition of level of each diaphragm with respect to the interconnecting framework.

7. In a device of the class described, in combination, a load receiver, supporting brackets depending from the load receiver, weight sensitive structure, frames supported by the weight sensitive structure, a framework connecting each of said frames to at least two other of said frames to prevent rocking of said frames on the weight sensitive structure, and members one for each bracket and frame that pivotally contact the frames and brackets to transmit force therebetween for supporting said brackets from said frame.

LAWRENCE S. WILLIAMS.

REFERENCES CITED

The following references are of record in the file of this patent:

UNITED STATES PATENTS

| Number | Name | Date |
| --- | --- | --- |
| 552,272 | Braley | Dec. 31, 1895 |
| 2,279,912 | Bohannan | Apr. 14, 1942 |
| 2,358,770 | Carliss | Sept. 19, 1944 |
| 2,359,721 | Williams | Oct. 3, 1944 |